United States Patent [19]

Buckelew

[11] 4,299,442
[45] * Nov. 10, 1981

[54] AIRCRAFT VISUAL COLLISION AND AVOIDANCE DEVICE

[76] Inventor: Arthur L. Buckelew, 977 Jeannett Ave., Thousand Oaks, Calif. 91360

[*] Notice: The portion of the term of this patent subsequent to Mar. 17, 1998, has been disclaimed.

[21] Appl. No.: 140,002

[22] Filed: Apr. 14, 1980

[51] Int. Cl.³ .................................................. G02B 5/12
[52] U.S. Cl. ........................................ 350/97; 340/25; 350/100
[58] Field of Search ................................ 350/97–106; 301/37; 340/25, 74; 325/16; 244/14; 40/125

[56] References Cited

U.S. PATENT DOCUMENTS

| | | | |
|---|---|---|---|
| 2,991,698 | 7/1961 | Leubaz | 350/105 |
| 3,867,013 | 2/1975 | Ashenfort | 350/97 |
| 3,975,083 | 8/1976 | Rowland | 350/103 |
| 3,980,393 | 9/1976 | Heasley et al. | 350/97 |
| 4,145,111 | 3/1979 | Hansson et al. | 350/97 |

Primary Examiner—R. A. Rosenberger
Attorney, Agent, or Firm—Dennis L. Mangrum

[57] ABSTRACT

The present invention relates to a device for use on airplanes to permit visual identification and location by pilots of other aircraft in the vicinity so as to avoid mid-air collision. The device receives light from any light source and reflects it to all points within at least a defined hemispherical area normal to the device, so as to make the plane visually observable by pilots, any other aircraft in the area. The device is formed as a tape and attached to various parts of an aircraft. The reflecting elements redirect and intensify each light source creating a readily recognizable shimmering image.

12 Claims, 5 Drawing Figures

U.S. Patent  Nov. 10, 1981  4,299,442
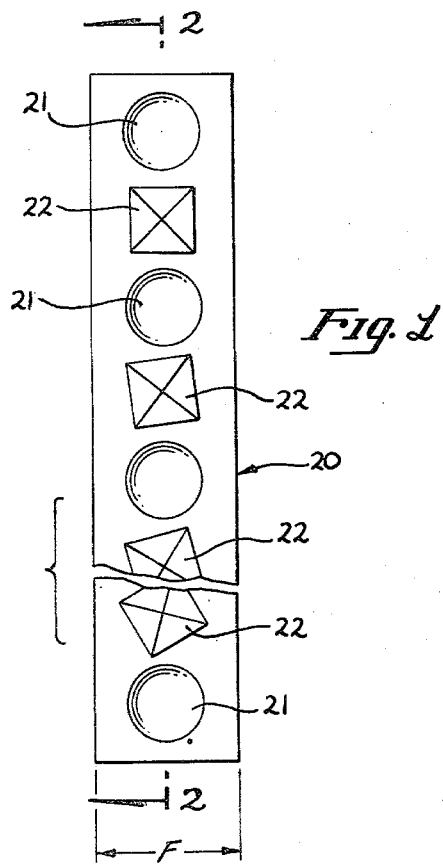
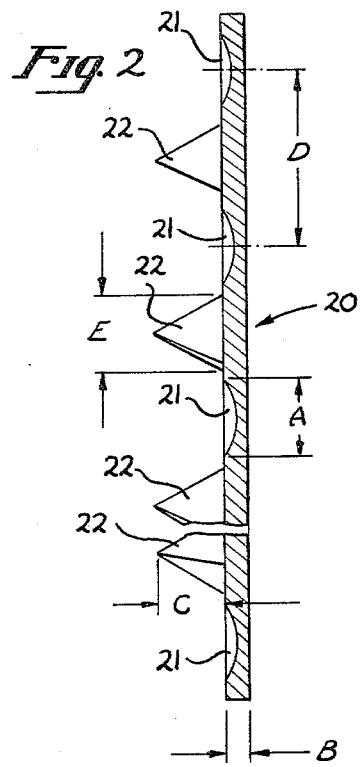
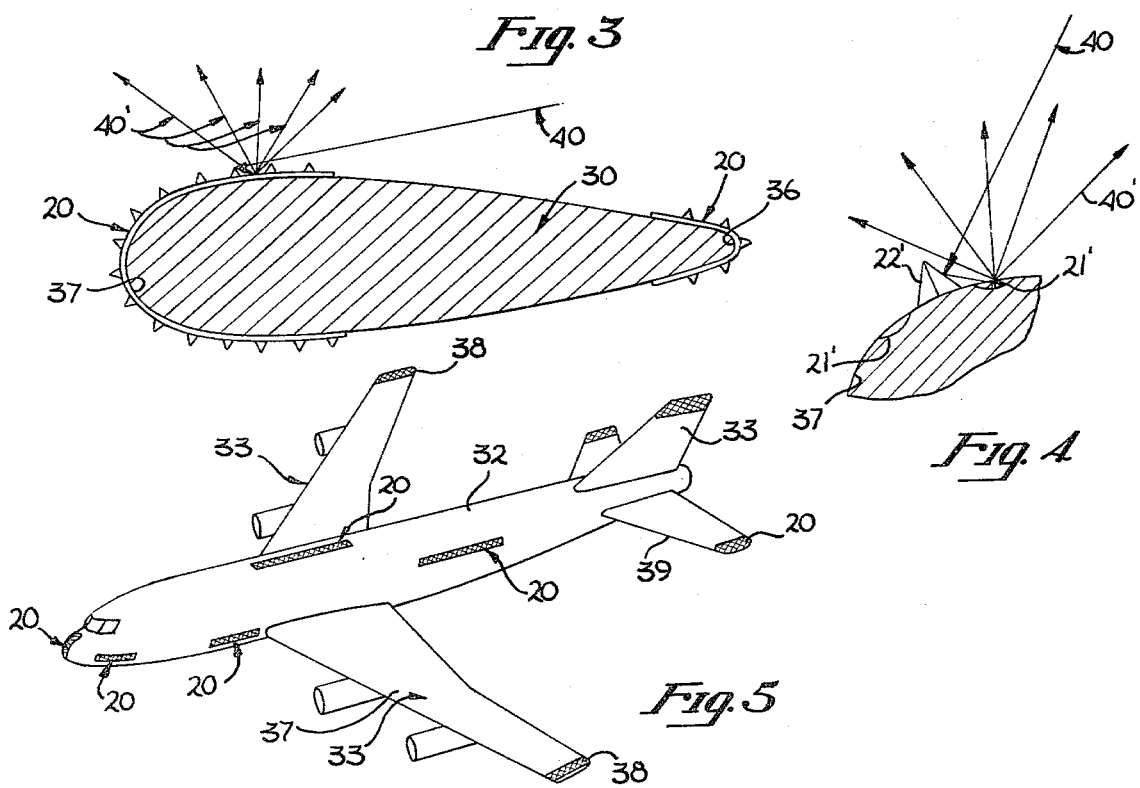

AIRCRAFT VISUAL COLLISION AND AVOIDANCE DEVICE

BACKGROUND OF THE INVENTION

1. Field of the Invention

The present invention relates to a device attached to aircraft capable of reflecting light so as to make an aircraft visually observable to pilots of other aircraft in the vicinity for collision avoidance.

2. Prior Art

The by-word in aviation for avoidance of mid-air collisions has always been to "see and be seen." That philosophy is becoming more and more important today because of the great increase in the number of aircraft being flown and and the cosmetic changes from early aviation. In the early days of aviation, the mid-air collision was not a concern or problem. Today, however, the mid-air collision is a real problem and a serious concern of all pilots. Mid-air collisions have happened and will continue to occur until aircraft are able to more readily be identified by pilots of other aircraft in the vicinity.

Mid-air collisions are of particular concern at the conjested points of air travel, namely airports. Several factors exist, which have created the great increase in mid-air collisions. First, airports are becoming conjested, causing stacking or delay in landing. Second, aircraft landing and take-offs are at high speeds. Third, aircraft are bigger, and consequently slower, to respond when evasive action is required. Last, aircraft cosmetics tend to camouflage, rather than make the aircraft easily identifiable.

Commercial aircraft approaching high density airports, as well as all airports, normally operate around 275 miles per hour, and may attain speed of between 90-150 miles per hour on take-off. Those high speeds create a very rapid closing rate between two converging aircraft, and shortens pilot reaction time for successful evasive action when a collision is pending. The general rule of thumb is that an aircraft on a colllsion course must be seen before it gets closer than two miles to permit successful avoidance corrective action to be taken. If the aircraft is first observed at a distance of one mile, only extreme evasive action may prevent a collision. If initial observation is closer than one mile, evasive action cannot avoid collision.

It is true today that several steps have been taken to help prevent mid-air collision, among them being regulations adopted by the Federal Aviation Agency (FAA) and improved radar facilities. Specifically, FAA Regulations attempt to provide certain corridors for incoming and outgoing aircraft, as well as to provide corridors for aircraft traveling in certain directions and/or holding patterns. Additionally, radar is used and has been improved as a warning device. Radar, both on board aircraft and in surface installations is used to warn pilots that other aircraft are in the area, or on a possible collision course. However radar only helps in warning of possible impending mid-air collision. The actual avoidance of mid-air collisions is the sole duty and responsibility of the aircraft pilots. In order for the pilots to take proper corrective action and to avoid mid-air collisions, they must "see and be seen." The warning devices such as radar, simply alert the pilot of an impending problem, the pilot must then locate the impending problem and take the proper corrective action.

A general misconception is that the safest time to fly is during daylight hours when unlimited visibility exists. However, in truth, the ability of pilots to "see and be seen", is the most difficult in bright daylight conditions. In the early days of aviation, aircraft were easier to be seen because they were metallic and highly reflective. The reflectivity made the aircraft easy to be visually observed. Today, however, aircraft are multicolored, striped, or otherwise marked and are in effect camouflaged. Some aircraft today, are painted in solid dark or light colors, compounding visual identification. For instance, a dark colored plane, when observed from above is almost impossible to see and blends in with the ground. Planes which are painted light colors are likewise difficult to locate when being observed against a sky background. The avoidance problem does not cease once the aircraft is sighted since just as often, a plane once sighted, is often visually lost because of the camouflage effect, either with the clouds, ground, or other background. To help solve this problem, strobes have been placed on wing tips and at other locations of the aircraft. However, strobes and lights are ineffective in bright sunlight and are only viable alternatives during night flying or low visibility conditions.

The airlines and the Federal Aviation Agency is constantly trying to solve this problem. Some of the above described warning devices help with the age old problem of "see and be seen", but have not proven successful, particularly in daylight conditions. Most of the prior art implementations are of the mechanical and very sophiscated in nature and only warn of aircraft in the area. They do not locate and identify. There are no known devices presently existing, which can be affixed to the body of an aircraft which make it capable of being easily located and observed by other pilots in the vicinity.

The present invention provides a device which is multidirectional and highly reflective and will greatly increase the "see and be seen" capabilities of any plane on which it is disposed. It will provide a reflective shimmering surface, which can be easily observed. It is especially effective on bright, sunny days where unlimited visibility exists. It is inexpensive and can be utilized on any aircraft without modification and will not affect the flying characteristics of the aircraft.

SUMMARY OF THE INVENTION

A "see and be seen" device for use on aircraft comprising a reflective surface, having; a plurality of circular, concave indentions disposed therein; and a plurality of pyramid shaped reflective elements disposed juxtapose the concave indentions, whereby light is reflected by the pyramid elements toward said concave indentions so as to be intensified and reflected to at least any point with an area defined by a hemisphere normal to the device, permitting the aircraft to be visually identified and located by pilots of other aircraft in the vicinity.

It is an object of the present invention to provide a device for affixing to aircraft which will scatter and multidirectionally reflect light and enable the aircraft to be seen by other aircraft in the vicinity.

It is still another object of the present invention to provide a reflective device which will intensify a light beam and reflect it multidirectionally, so that the aircraft can be identified and located by pilots of other aircraft in the vicinity.

It is still another object of the present invention to provide a device for affixing to aircraft, which will reflect sunlight so as to create a shimmering reflection observable in bright daylight so that the aircraft can be identified and located by other pilots of aircraft in the vicinity.

It is still another object of the present invention to provide a low cost device for affixing without modification to any existing aircraft, which will reflect light efficiently and economically.

It is still another object of the present invention to provide a device which will reflect light and make an aircraft visually identifiable, yet, not increase wind drag, resistance or other aircraft flying characteristics.

BRIEF DESCRIPTION OF THE DRAWING

FIG. 1, illustrates a top view of the reflective surface and the unique array of reflecting devices comprised of circular concave identations and protruding pyramid elements;

FIG. 2, is a cross-sectional view of section 2—2 of FIG. 1;

FIG. 3, is a cross-sectional view of a wing tip, illustrating the device of the present invention applied to the curved surface of the wing showing a single light beam striking one reflective pyramid;

FIG. 4, is a blown-up view of FIG. 3, illustrating the partial result of a single light beam striking a single pyramid in the device of the present invention;

FIG. 5, is a perspective view of a typical aircraft illustrating various placements of the reflective device of the present invention.

DETAILED DESCRIPTION OF THE PREFERRED EMBODIMENT

The present invention is a "see and be seen" device for use on aircraft. This device is extremely effective in making an aircraft visable and identifiable and is not known in the prior art. The most critical cause of mid-air collision of aircraft is the inability of aircraft pilots to observe, identify, and locate aircraft, in the vicinity, particularly, in bright daylight. The problem is particularly critical in modern aviation because of the large, slow reacting, yet, high speed commercial aircraft being flown. Radar and other technological developments, presently employed, warn pilots of aircraft in their vicinity and have helped to some degree solve this problem. However, the warning devices do not and have not prevented mid-air collisions. The warning devices do not locate the approaching aircraft. After a warning occurs, the pilots must make visual contact to take proper corrective action. For such corrective action to be taken, pilots must "see and be seen."

The present invention is a device which can be easily applied to all presently existing aircraft. The device is economical and will greatly enhance identification and location of all aircraft in a vicinity through visual observation. The physical components of the present invention will first be described in detail, after which its use and interaction of the physical components, will be described.

Referring first, to FIGS. 1 and 2, the preferred form of the present invention is illustrated. In FIG. 1, a plan view is shown, while in FIG. 2, a cross-sectional view is illustrated. The reflective device 20, is formed in the preferred form of a thin mirror coated plastic tape material 23. The front surface 24, of the mirror coated plastic, has formed therein, an array of circular, concave elements 21. The mirror coated plastic tape member 23, may be formed by various techniques previously known in the art. For instance, however, the concave elements 21, can be formed by force impression or by being premolded into the plastic tape material 23, either of which is acceptable as are other alternate methods. In the preferred form, the circular, concave elements are 1 inch in diameter, distance 'A', in FIG. 2, and are spaced center to center 2 inches, a distance of distance 'D', in FIG. 2. In the preferred form, the tape is 1½ inches wide, a distance 'F' in FIG. 1. Thus, an ordinary strip of the tape 23 would be as long as needed, and permit the tape 23 to be manufactured in a long continuous strip. The depth 'B' of the indention, is best determined from optical considerations. The purpose of the circular, concave elements 21, is to provide a reflective surface which intensifies and directs lightwaves to a much greater extent than a flat surface and in the preferred form has a 1/16 inch maximum depth. The back side 25, of the tape material 23, contains an epoxy material, for securing the reflective device 20 to the aircraft.

In the preferred form of the present invention, a series of twelve reflecting elements 22, are used for each unique array. However, in fabrication, the tape could be formed as continuous and the series of 12 pyramid reflecting elements 22 would be repeated. The pyramid elements 22, are disposed between each circular concave element 21, FIG. 1. The pyramid 22, in the preferred form is formed by force impression, or by being premolded into the plastic tape 23. Other methods may be employed for forming the tape as a single unitary member, or the pyramids may be premanufactured and secured to the tape 23. The base 'E' of pyramid 22 in the preferred form is 1 inch, and a height indicated as 'C' of ⅜ inches. The pyramids 22 serve two basic reflective functions (1) to reflect directly a single light source in multitudinal directions; and (2) to redirect light to the circular concave elements 21. This redirecting is illustrated in FIGS. 3 and 4. The unusual effects and results of this redirection is discussed following the physical description.

As indicated in FIG. 1, twelve reflecting pyramids 22, are disposed within each unique array 20. Each pyramid element 22, within the array in the preferred embodiment, is rotated so as to be in a different axial relationship to the longitudinal axis of tape 23, within that array. Particularly, and in the preferred form, the pyramids 22 are rotated, so that each axis is in a different angular relationship and in the preferred form 3.75°, or a multiple thereof, from the axis of the tape 23. This particular rotation permits collection and reflection of light originating from any angle within a 360° horizontal plane and at least a 180° vertical plane (or an area generally hemispherical in shape) to strike at least one pyramid 22, and redirect it towards at least one reflective surface 21. Often, however, many more than one reflective surface and pyramid will be involved in collecting and reflecting light. In the preferred form, each pyramid 22, is rotated 3.75° beginning at top and proceeding to the bottom such that one particular point on a pyramid rotates through a 90° arc.

Having now described in some detail, the physical characteristics of the preferred form of the present invention, a typical use and application will be described. Referring first to FIG. 3, the reflective device 20, is shown disposed on the front portion 37 of the wing 30, of a typical aircraft. An additional strip is shown disposed on the rear edge 36, of the wing 30. Referring now to FIG. 4, an enlarged view of FIG. 3, light 40, is directed towards pyramid element 22. As light 40 strikes element 22', it is reflected at least in part toward element 21'. At that point, the lens effect created by the concave formation of element 21' intensifies and redirects light 40' in multitudinal directions. As the plane moves light 40 will strike another pyramid 22 and change slightly the reflective pattern. Hence, an observer will notice the phenomenon as a shimmer. This shimmering effect causes aircraft to be readily identified. It is the constantly charging reflection pattern which draws attention to the aircraft and permits it to be seen.

Referring to FIG. 5, a typical aircraft 50 is shown, having disposed thereon strips of the reflective device 20. The strips are disposed at critical locations about the aircraft to provide optimum visual identification possibilities. In the preferred form, strips are disposed on wing tips 38, top and bottom of fusalage, nose 31, and on portions of the tail assembly 39. The optimum location may vary from aircraft to aircraft, depending on the aircraft flight characteristics. However, observation must be available from top, bottom, front and back. Disposition of the reflective devices 20, particularly on wing tips permits optimum reflection because of the curved surface, the reflection pattern is highly visible even when two aircraft are approaching front to front or back to front. No reflective pattern is created without the present invention in such conditions.

The present invention is formed of a light weight material so as not to increase the weight of the aircraft. The concave indentations 21, create a dimple pattern and in effect reduce wind drag. The pyramid elements 22, do, however, increase wind drag a small amount. The total net effect is that the drag is neither increased or decreased.

In an alternate embodiment, strobes and lights are disposed so as to be directed toward the device to create a shimmering pattern to increase visability both in day and night.

The present invention is also very useful for locating downed aircraft. Many times, the approximate location of downed aircraft is known, but air search is unable to locate by visual observation. The use of the present invention would enable a downed aircraft to be easily spotted from the air because of highly visible reflection pattern. Rapid location of downed aircraft is important because any survivor may require immediate medical care. The present invention serves many uses as have been described, in addition to other uses and purposes, all of which are obvious to those skilled in the art.

While the present invention has been described herein, it will be understood by those skilled in the art, that various changes in forms and details may be made therein, without departing from the spirit and scope of the invention.

I claim:

1. A "see and be seen" device for use on aircraft capable of receiving light from at least a one direction and for redirecting it in many directions having reflective means comprising:

(a) a plurality of first elements serving as a lens means;
    (b) a plurality of second elements serving as means for directing light to said lens means;

whereby the reflected light from said device causes said aircraft to be visually identified and located by other aircraft pilots in the vicinity.

2. The "see and be seen" device of claim 1, wherein said reflective means is comprised of a plurality of circular concave elements for serving as a lens means for intensifying light and for redirecting said intensified light outward in many directions.

3. The "see and be seen" device of claim 1, wherein said reflective means is comprised of a plurality of second element means of pyramid shaped reflective elements disposed so as to be capable of receiving light from any direction and for reflecting said light towards at least one of said lens means.

4. A "see and be seen" device capable of being disposed on various portions of an aircraft, capable of receiving light from any direction and for reflecting it outward in many directions comprising:

(a) a first reflecting means, having formed therein, an array of concave circular identations for serving as a lens means for intensifying and directing said light outward in many directions;
    (b) a second reflecting means comprising an array of pyramid shaped elements disposed adjacent to and between said concave circular indentations for receiving light from any direction and for reflecting and redirecting light toward at least one of said concave circular identations;

whereby, the reflected light causes said aircraft to be visually identified and located by any other aircraft pilots in the vicinity.

5. The "see and be seen" device of claim 4, wherein said concave circular identations are one inch in diameter and are spaced two inches center to center apart.

6. The "see and be seen" device of claim 5, wherein said pyramid shaped elements are disposed between each of said concave circular indentations.

7. The "see and be seen" device of claim 6, wherein said pyramid shaped elements have a one inch base and are ⅜ inch in height.

8. The "see and be seen" device of claim 4, wherein said pyramid shaped elements and concave circular elements are formed from a single reflective material.

9. The "see and be seen" device of claim 4, wherein each of said pyramid shaped elements is rotated about it's principle axis so as to have a different principle angular axial relationship with each other pyramid shaped element.

10. The "see and be seen" device of claim 9, wherein said angular displacements is a multiple of 3.75 degrees.

11. The "see and be seen" device of claim 4, wherein said device is formed from mirror coated plastic.

12. The "see and be seen" device of claim 4, wherein said device can be affixed to strategic portions of said aircraft, such as; wing tip, tail tip, fuselage top, fuselage bottom, wing edges and other areas for optimum visual observation, without affecting the flying characteristics of the aircraft.

* * * * *